Nov. 5, 1963  F. H. SWAIM ETAL  3,109,661
LOW TORQUE ROTARY SEAL
Filed Jan. 10, 1962

DAVID W. RABENHORST
FRANK H. SWAIM
INVENTORS

BY O. Baxter Warner
Claude Funkhouser

ATTORNEYS

United States Patent Office 3,109,661
Patented Nov. 5, 1963

3,109,661
LOW TORQUE ROTARY SEAL
Frank H. Swain and David W. Rabenhorst, Silver Spring, Md., assignors to the United States of America as represented by the Secretary of the Navy
Filed Jan. 10, 1962, Ser. No. 165,460
6 Claims. (Cl. 277—70)

This invention relates generally to seals, and more particularly to an improved fluid pressure responsive seal assembly capable of functioning effectively and with low torque characteristics in an environment of extreme pressure and temperature.

With the advent of rotating joints and connections for use in environments where relatively high pressures and temperatures are present, it has become necessary to have sealing arrangements capable of operating effectively under such extreme conditions. A great number of seals exist for use under less severe conditions, but they invariably fail in some manner when subjected to the extremely hot gases and high pressures such as are to be found in applications where rocket exhaust gases or high pressure steam are present. The instant invention provides a fluid pressure responsive seal assembly capable of effective sealing action under temperatures and pressures in excess of 600° F. and 1200 p.s.i., respectively, and which is relatively economical to construct.

A problem often encountered when fluid pressure responsive seals are employed in environments where pressures may vary from zero to several hundred p.s.i. in a short period of time is to provide a seal which will function properly at all levels over the entire pressure range. Often, a particular seal will be effective at either high pressure or low pressure, but not at both. The seal of the invention is so constructed as to function effectively throughout a range of pressures from zero to several hundred p.s.i., while at the same time not requiring fine tolerances between mating surfaces.

Another problem encountered in fluid pressure seals, especially those constructed of materials such as Teflon which possess cold flow characteristics, is that under exposure to high fluid pressures the seal will often become deformed to the point where its effectiveness is lessened. The present invention to a considerable degree solves this problem by so constructing the sealing element that fluid pressure will tend to cause it to retain its initial configuration.

Still another problem with many rotary seals is the relatively high friction present when they are revolved. In the seal assembly of the invention the geometry of the sealing ring is so designed as to obtain a minimum of friction losses, while retaining structural rigidity and excellent sealing characteristics.

It is, therefore, an object of this invention to provide a fluid pressure responsive seal assembly so constructed as to seal effectively over a wide range of pressures and under conditions of relatively high temperatures.

Another object of the invention is to provide a rotary fluid pressure responsive seal that is economical of construction and that has relatively low torque characteristics.

A further object of the invention is to provide a rotary seal assembly so constructed as to require but moderate dimensional tolerances, and which will seal effectively at very low pressures.

Still another object of the invention is to provide a fluid pressure responsive seal so constructed as to minimize cold flow deformation of the material from which the seal is made.

Other objects and many of the attendant advantages of this invention will be readily appreciated as the same becomes better understood by reference to the following detailed description when considered in connection with the accompanying drawings, wherein.

The seal assembly of the invention comprises a sealing ring having a raised land on both the periphery and one face thereof, and a plurality of radially directed, circumferentially spaced bores extending therethrough. The sealing ring is disposed in a groove in the inner of two concentrically disposed, relatively rotatable members, a resilient back-up ring being disposed thereunder and arranged to urge the lands thereon into engagement with their respective mating surfaces to create an initial, low pressure seal. As fluid under pressure flows between the two members a portion thereof flows through the bores to the inner periphery of the sealing ring, where it acts to urge the lands into even tighter engagement with their mating surfaces; thus, as fluid pressures increases the force urging the lands into sealing engagement also increases proportionately. The sealing ring is preferably constructed of polytetrafluoroethylene, referred to as "Teflon" commercially, which material is capable of withstanding relatively high temperatures without failure and has a self-lubricating characteristic which greatly reduces sliding friction over the more common seal materials.

Figure 1:
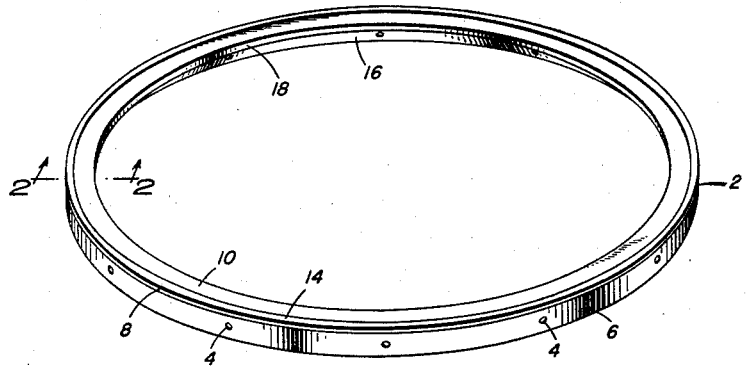
FIG. 1 is a perspective of the sealing ring of the invention.
Figure 2:
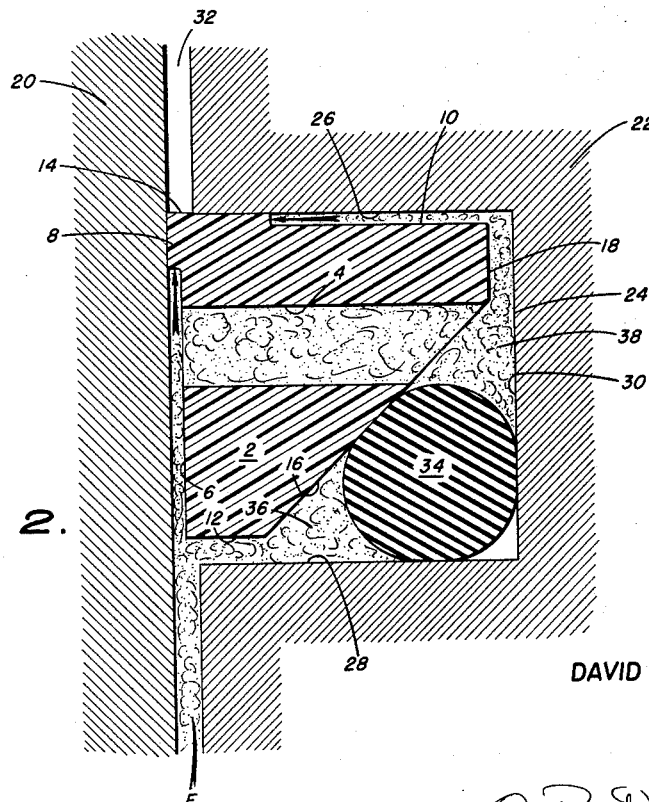
FIG. 2 is an enlarged section of the seal assembly of the invention showing the manner in which the seal functions, the cross-section of the sealing ring therein being taken generally at 2—2 in FIG. 1.

Referring now to the drawings, a sealing element 2 is shown in perspective in FIG. 1 and in cross-section in FIG. 2, and comprises an annular ring having a plurality of radially-directed, circumferentially spaced bores 4 therethrough. The outer peripheral surface 6 of the ring is cylindrical, and has a cylindrical, raised land 8 formed thereon at the upper end thereof. The top face 10 and bottom face 12 of the sealing ring are radial planes, and an annular, raised land 14 is formed on said top face at its outer peripheral edge. The lower, radially inner corner of the ring is beveled at an angle of about 45 degrees to form a frusto-conical surface 16, the width of said surface 16 being such that the bottom face 12 and the inner cylindrical face 18 of the sealing ring are about one-third the length of the face 10 and the cylindrical surface 6, respectively.

In use the sealing ring 2 is intended to seal the space between two concentrically-disposed, relatively rotating cylindrical members. Referring to FIG. 2, portions of an outer cylindrical member and an inner cylindrical member are shown in section at 20 and 22, respectively, the latter having a rectangular, peripheral groove 24 therein defined by a top, radial wall 26, a bottom, radial wall 28, and a cylindrical wall 30. The cylindrical members 20 and 22 have a small clearance 32 therebetween, and the radial distance between the wall 30 and the inner surface of member 20 is substantially greater than the radial dimension of the sealing ring 2. Similarly, the distance between walls 26 and 28 is greater than the axial dimension of the sealing ring, the larger size of the groove relative to the ring permitting a degree of misalignment between the concentrically disposed members 20 and 22.

The sealing ring 2 is disposed in the groove 24 with the lands 8 and 14 facing away from the source of any fluid leakage in the clearance 32, and with the faces on the lands 8 and 14 in contact with the inner surface of cylindrical member 20 and the walls 26 of groove 24, respectively. An annular, originally circular in cross-section ring 34 of resilient material, such as a suitable rubber compound, is disposed in the groove 24 between walls 28 and 30 thereof and the frusto-conical surface 16 on the sealing ring. The resilient ring 34 is sufficiently large to be deformed by the sealing ring, and it thus urges the lands 8 and 14 on the latter into sealing engagement with their respective mating surfaces to thereby seal the clearance 32 against leakage therethrough of fluid having a very low pressure.

The presence of the resilient ring 34 divides the volume between the sealing ring 2 and the walls of the groove 24 into two chambers, an upper chamber 36 and a lower chamber 38. Because the sealing ring is intended to function in response to fluid pressure, it is necessary that fluid flowing through clearance 32 be permitted to enter both chambers 36 and 38; otherwise, an unbalance of forces will be present which will act to reduce rather than increase the sealing effectiveness of the ring. The lower chamber 36 is open to the clearance 32, and hence presents no problem. Chamber 38 is normally sealed off by the resilient ring, but the radial bores 4 provide access thereto, and hence allow fluid flowing through clearance 32 to enter said chamber.

When fluid, indicated at F in the drawings, flows through clearance 32 into the region of the groove 24 a portion thereof flows through the circumferentially spaced bores 4 into chamber 38, and a portion enters chamber 36. The sealing ring is thus surrounded by fluid, save for the sealing surfaces of the lands 8 and 14, which surfaces are forced into ever tightening engagement with their respective mating surfaces as the pressure of the fluid increases. The lands 8 and 14 provide several advantages in the seal assembly. First, the forces exerted by the presence of the pressurized fluid, said forces being symbolically represented in the drawing by arrows impinging on the exposed surfaces of the lands, are concentrated on a relatively small sealing area, thus insuring greater contact. Secondly, because the sealing surfaces on the lands are relatively small accurate manufacture thereof is facilitated.

Another important advantage derived from the lands relates to the cold flow characteristics of Teflon and similar materials, of which the seal would normally be constructed. The lands create spaces between the surfaces 6 and 10 of the sealing ring and the surfaces which they face, into which spaces pressurized fluid may flow. Thus, the sealing ring is completely encased by pressurized fluid, save for the sealing surfaces of the lands and the area of surface 16 that is in contact with resilient ring 34. The presence of a uniform, confining pressure over almost the entire surface of the sealing ring reduces greatly any tendency toward cold flow deformation which the material of the sealing ring might otherwise exhibit.

The use of the lands is also a major factor in obtaining the very low friction losses associated with rotation of the seal. By reducing the actual area of the sealing ring that is in friction-producing contact, total friction is reduced to a minimum. The use of the lands allows this small contact area, while the geometric configuration of the remainder of the sealing ring provides the necessary structural strength.

While the resilient ring 34 has been described as being round in cross-section, it is to be understood that other configurations might be equally well employed. Similarly, the shape of the groove 24 may also be varied without departing from the teachings of the invention.

Obviously, many modifications and variations of the present invention are possible in the light of the above teachings. It is therefore to be understood that within the scope of the appended claims the invention may be practiced otherwise than as specifically described.

What is claimed is:

1. A seal assembly comprising, in combination, an outer hollow cylindrical member, an inner cylindrical member disposed concentrically within said outer member and having an annular groove therein, an annular sealing ring received in said groove, said sealing ring having thereon a first raised land positioned to engage said outer member and a second raised land positioned to engage one of the walls defining said groove, resilient means disposed within said groove and in engagement with said sealing ring for urging the outer surfaces of said lands into sealing engagement with their respective mating surfaces, said resilient means and said sealing ring dividing the inner cylindrical member into upper and lower chambers, and bore means in said sealing ring positioned to allow fluid flowing between said two members and into said chambers to substantially surround all of said sealing ring except the sealing surfaces on said lands.

2. A seal assembly as claimed in claim 1, wherein said first and second lands are positioned immediately adjacent each other and define an outer peripheral corner of said seal, and wherein said resilient means engages said seal on an inner corner thereof positioned opposite said outer peripheral corner.

3. A seal assembly as recited in claim 2, wherein said inner corner in engagement with said resilient means is bevelled, and wherein said bore means comprises a plurality of radially directed bores extending through said ring and spaced from said first and second lands.

4. A seal assembly comprising, in combination, an outer, hollow cylindrical member, an inner cylindrical member disposed concentrically within said outer member and having an annular groove therein, one wall of said groove defining a radial plane, an annular sealing ring received in said groove and having a plurality of circumferentially spaced, radially directed bores therein, said sealing ring having a cylindrical outer surface and at least one radial plane end surface, a cylindrical, raised land on said cylindrical surface positioned to sealingly engage said outer member, an annular, raised land on said plane end surface positioned to engage said radial wall of said groove, and resilient means disposed within said groove and in engagement with said sealing ring for urging the outer surfaces of said lands into sealing engagement with their respective mating surfaces, said resilient means and said sealing ring dividing said inner cylindrical member into upper and lower chambers, and said portions permitting entry of fluid under pressure into said chambers and into contact with portions of said resilient means for compressing the same.

5. A seal assembly as claimed in claim 4, wherein said cylindrical and said annular land are positioned immediately adjacent each other at an outer peripheral corner of said sealing ring, and wherein said resilient means engages said seal on an inner corner thereof positioned opposite said outer peripheral corner.

6. A seal assembly as claimed in claim 5, wherein said inner corner is bevelled, and wherein said resilient means comprises an annular, circular in cross-section member of resilient material.

References Cited in the file of this patent

UNITED STATES PATENTS

| | | |
|---|---|---|
| 1,649,474 | Johnston et al. | Nov. 15, 1927 |
| 1,988,726 | Godron | Jan. 22, 1935 |
| 3,033,578 | Kellogg | May 8, 1962 |